US012676274B2

(12) United States Patent
Nair

(10) Patent No.: US 12,676,274 B2
(45) Date of Patent: Jul. 7, 2026

(54) METHODS AND SYSTEMS INCLUDING LEAF SPRINGS FOR A RELAY

(71) Applicant: Transportation IP Holdings, LLC, Norwalk, CT (US)

(72) Inventor: Rishin Nair, Bengaluru (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 741 days.

(21) Appl. No.: 18/068,185

(22) Filed: Dec. 19, 2022

(65) Prior Publication Data

US 2024/0203679 A1 Jun. 20, 2024

(51) Int. Cl.
*H01H 50/64* (2006.01)
*H01H 50/18* (2006.01)

(52) U.S. Cl.
CPC .......... *H01H 50/645* (2013.01); *H01H 50/18* (2013.01)

(58) Field of Classification Search
CPC .................................................... H01H 50/645
USPC .......... 335/201, 153, 93, 205, 220–221, 235
See application file for complete search history.

(56) References Cited

U.S. PATENT DOCUMENTS 3,605,047 A * 9/1971 Kasahara ............... H01H 71/58 335/170
3,914,723 A * 10/1975 Goodbar ............ H01H 51/2236 335/170
3,919,676 A * 11/1975 Bratkowski ........ H01H 51/2236 335/79
4,367,448 A * 1/1983 Nishizako .............. H01H 9/443 335/201
4,774,485 A * 9/1988 Dietrich ............. H01H 51/2209 335/78
4,998,082 A * 3/1991 Duimstra ............... H01H 51/06 335/181
5,109,146 A * 4/1992 Maenishi ............... H01H 9/443 335/201
5,343,190 A * 8/1994 Rodgers ................... A43B 3/50 36/137
6,124,771 A * 9/2000 Kim ..................... H01H 50/646 335/4
6,492,887 B1 * 12/2002 Diem ................... H01H 50/005 335/229
6,501,357 B2 * 12/2002 Petro .................. H01H 51/2209 335/229
6,700,466 B1 * 3/2004 Yamamoto ............. H01H 9/302 335/201
10,176,952 B2 * 1/2019 Itoda ...................... H01H 50/54
(Continued)

*Primary Examiner* — Alexander Talpalatski
(74) *Attorney, Agent, or Firm* — K&L Gates LLP

(57) ABSTRACT

An electromechanical relay is disclosed herein. The relay can include a first group of fixed and moving contacts arranged within a first assembly, a second group of fixed and moving contacts arranged within a second assembly, and a first magnetic device arranged between a first lateral wall and a second lateral wall of the first assembly and a second magnetic device arranged between first and second lateral walls of the second assembly, wherein the first and second magnetic devices include a first leaf spring and a second leaf spring, each of the first and second leaf springs including ends coupled to magnetic protrusions of the first and second magnetic devices, and wherein ends of the first and second leaf springs include a slot configured to receive one of the magnetic protrusions.

11 Claims, 7 Drawing Sheets

(56) References Cited

U.S. PATENT DOCUMENTS

| | | | | |
|---|---|---|---|---|
| 10,211,017 | B2 * | 2/2019 | Tajbakhsh ............ | H01H 50/026 |
| 10,229,803 | B2 * | 3/2019 | Tajbakhsh ............ | H01H 51/285 |

* cited by examiner

METHODS AND SYSTEMS INCLUDING LEAF SPRINGS FOR A RELAY

BACKGROUND

Technical Field

Embodiments of the subject matter disclosed herein relate to an electromechanical relay.

Discussion of Art

Electrically operated switches (e.g., relays) may include a primary circuit coupled to a coil and a plurality of contacts coupled to a secondary circuit. Positions of moving contacts may be adjusted based on a voltage being applied to the coil. The relay may include a magnet to reduce an arc generated during the switching of the moving contacts.

BRIEF DESCRIPTION

In one embodiment, a system includes an electromechanical relay comprising at least one magnetic device arranged within a magnetic assembly and retained within walls of the magnetic assembly via a leaf spring.

In another embodiment, an electromechanical relay includes a first group of fixed and moving contacts arranged within a first assembly, a second group of fixed and moving contacts arranged within a second assembly and a first magnetic device arranged between first and second lateral walls of the first assembly and a second magnetic device arranged between first and second lateral walls of the second assembly.

In a further embodiment, a mounting plate comprising a plurality of magnetic assemblies, each of the magnetic assemblies comprising a plurality of moving contacts configured to actuate between corresponding fixed contacts, wherein lateral walls separate a first set of moving and fixed contacts from a second set of moving and fixed contacts, further comprising a magnetic device arranged in a gap between the lateral walls and retained within the gap via only leaf springs.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Embodiments of the invention are disclosed in the following description, and may relate to systems for an electromechanical relay. In one example, the electromechanical relay may be arranged in a mobile asset. The mobile asset may be a plane, a locomotive, a passenger vehicle, a commercial vehicle, a heavy-duty vehicle, an off-highway vehicle, or other similar vehicle. The electromechanical relay described herein may be included in a variety of electrical system outside the context of the mobile asset.

Figure 1:
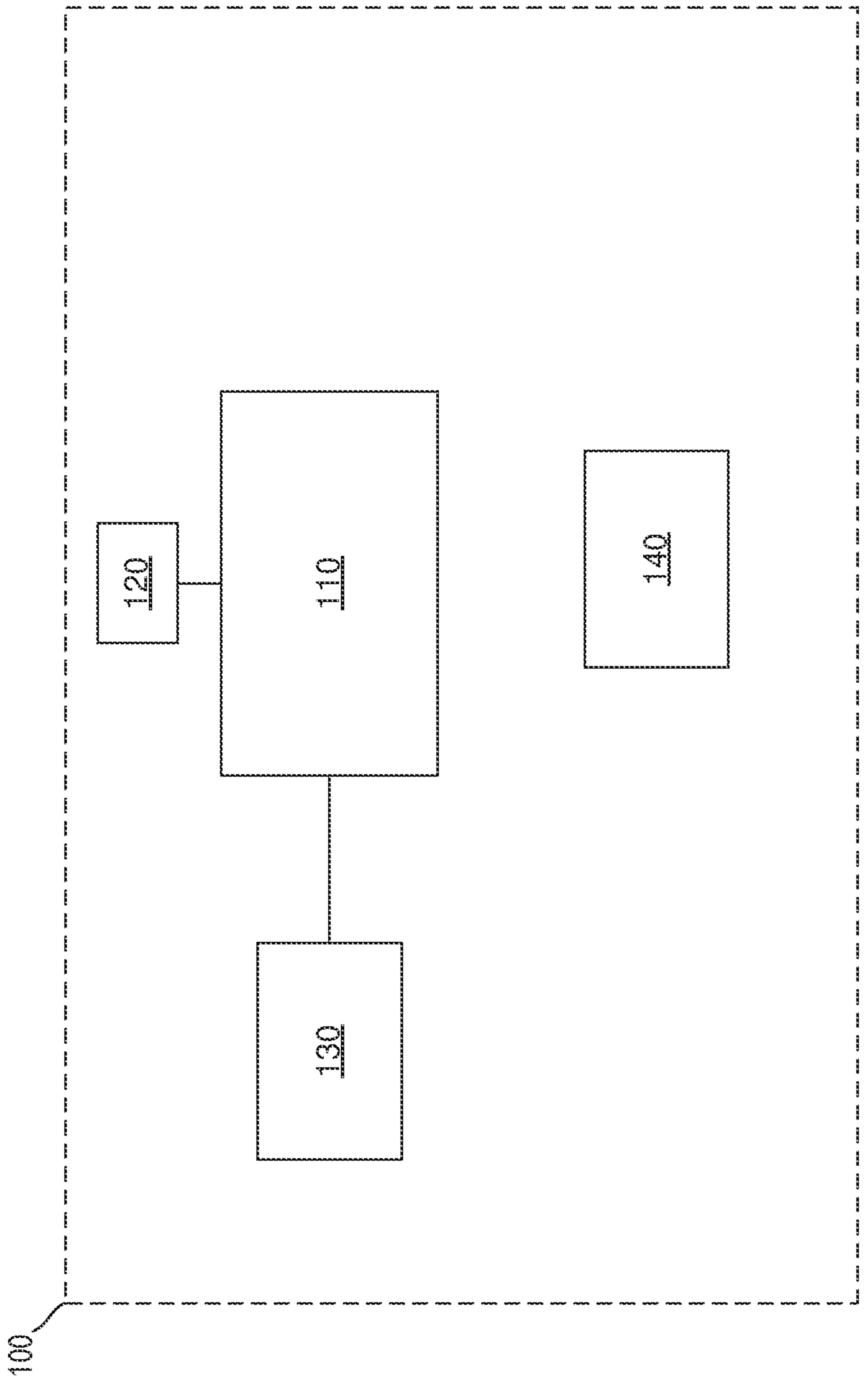
FIG. 1 shows an example embodiment of a mobile asset which may include the relay of the present disclosure.

FIG. 1 depicts an example train 100 including a propulsion system 110 coupled to a fuel system 120 and an exhaust system 130. The propulsion system may include an electric motor, an internal combustion engine (ICE), or other power device. The ICE may be configured to combust multiple fuels comprising varying amounts of carbon. The train may further include an auxiliary system 140. The auxiliary system may include a heating, ventilation, and air conditioning (HVAC) system, or other system type.

In one embodiment, the relay system may be connected to send a signal between two different stations. In this embodiment, the relay system may be installed in a trackside panel. The relay system may include a notification system, such as a Train Protection Warning System or Automatic Warning System, to actuate respective trigger devices to act upon a variety of conditions.

The auxiliary system may include an electrical system configured to utilize a relay (e.g., an electromechanical switch) configured to activate/deactivate different circuits coupled to the relay. Examples of the relay system are shown in FIGS. 2-8 and described below.

Figure 2:
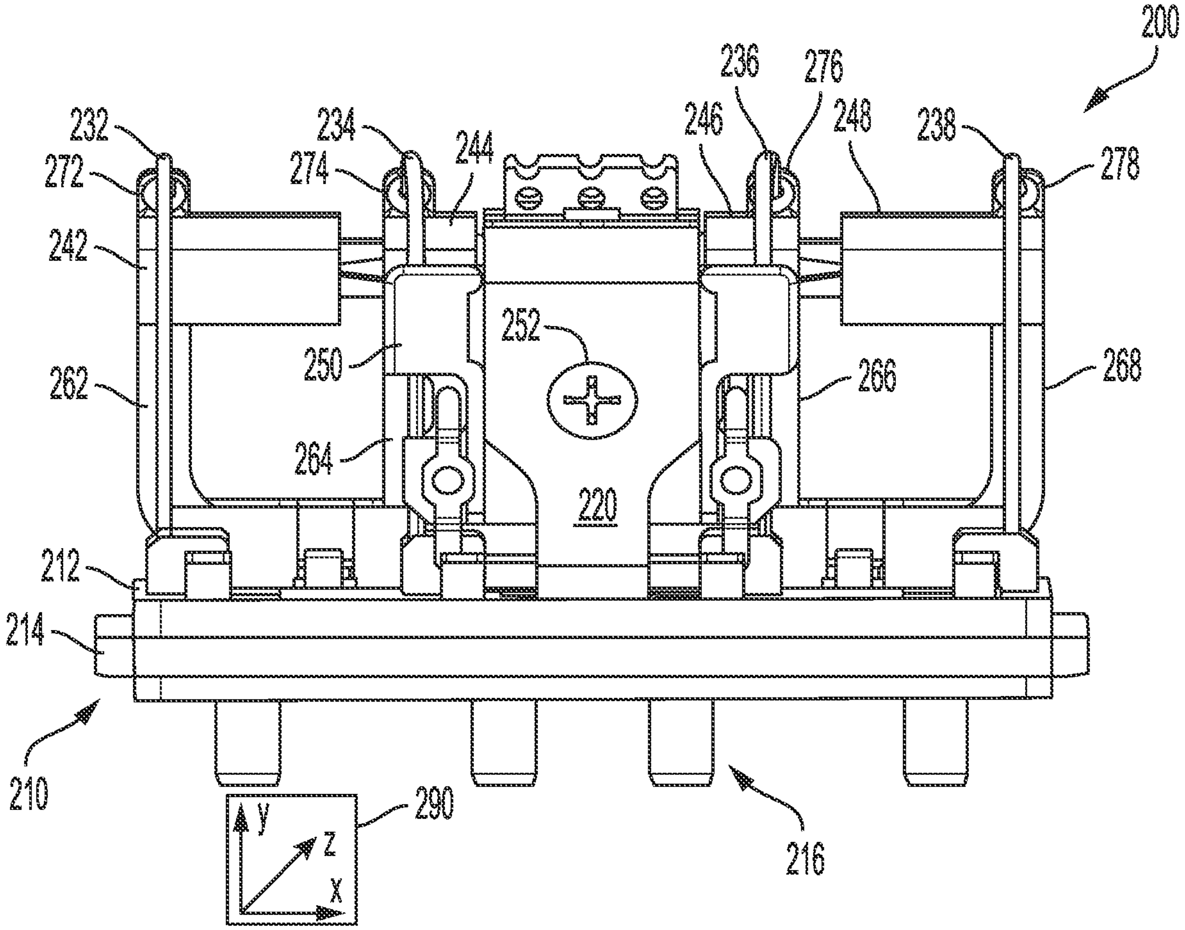
FIG. 2. shows a schematic diagram of the relay, according to an embodiment of the present disclosure.

Turning now to FIG. 2, it shows an electromechanical relay assembly 200. An axis system 290 is shown comprises three axes, namely an x-axis parallel to a horizontal direction, a y-axis parallel to a vertical direction, and a z-axis normal to the x- and y-axes.

The electromechanical relay assembly may include a mounting plate 210 physically coupled to portions of an upper section 220. In one example, the mounting plate and the upper section form a rigid frame configured to support the relay contents. The mounting plate may include a square or a rectangle shaped main body 212. A rim 214 may extend from an outer wall of the main body in a x-z plane. A plurality of tabs 216 may extend from the main body in a direction normal to the rim. In one example, the plurality of tabs are terminals.

A plurality of wires including a first wire 232, a second wire 234, a third wire 236, and a fourth wire 238 may extend from one or more contacts (shown in FIG. 3) to one or more contact carriers, including a first contact carrier 242, a second contact carrier 244, a third contact carrier 246, and a fourth contact carrier 248. Each of the wires may extend from a corresponding mounting plate terminal to a corresponding contact carrier terminal.

A core 250 may be physically coupled to the upper section via a fastener 252. A wire or coil may be wound around the core and configured to generate an electromagnetic field when a current is provided thereto. Moving contacts coupled to the mounting plate may move in response to the electromagnetic field from a first position contacting a first fixed contact to a second position contacting a second fixed contact. The electromechanical relay assembly may include a plurality of moving contacts that extend from the mounting plate to each of the contact carrier terminals. More specifically, a first moving contact 262 extends from the mounting plate to a first contact carrier terminal 272 coupled to the first wire. A second moving contact 264 extends from the mounting plate to a second contact carrier terminal 274 coupled to the second wire. A third moving contact 266 extends from the mounting plate to a third contact carrier terminal 276 coupled to the third wire. A fourth moving contact 268 extends from the mounting plate to a fourth contact carrier terminal 278 coupled to the fourth wire.

Figure 3:
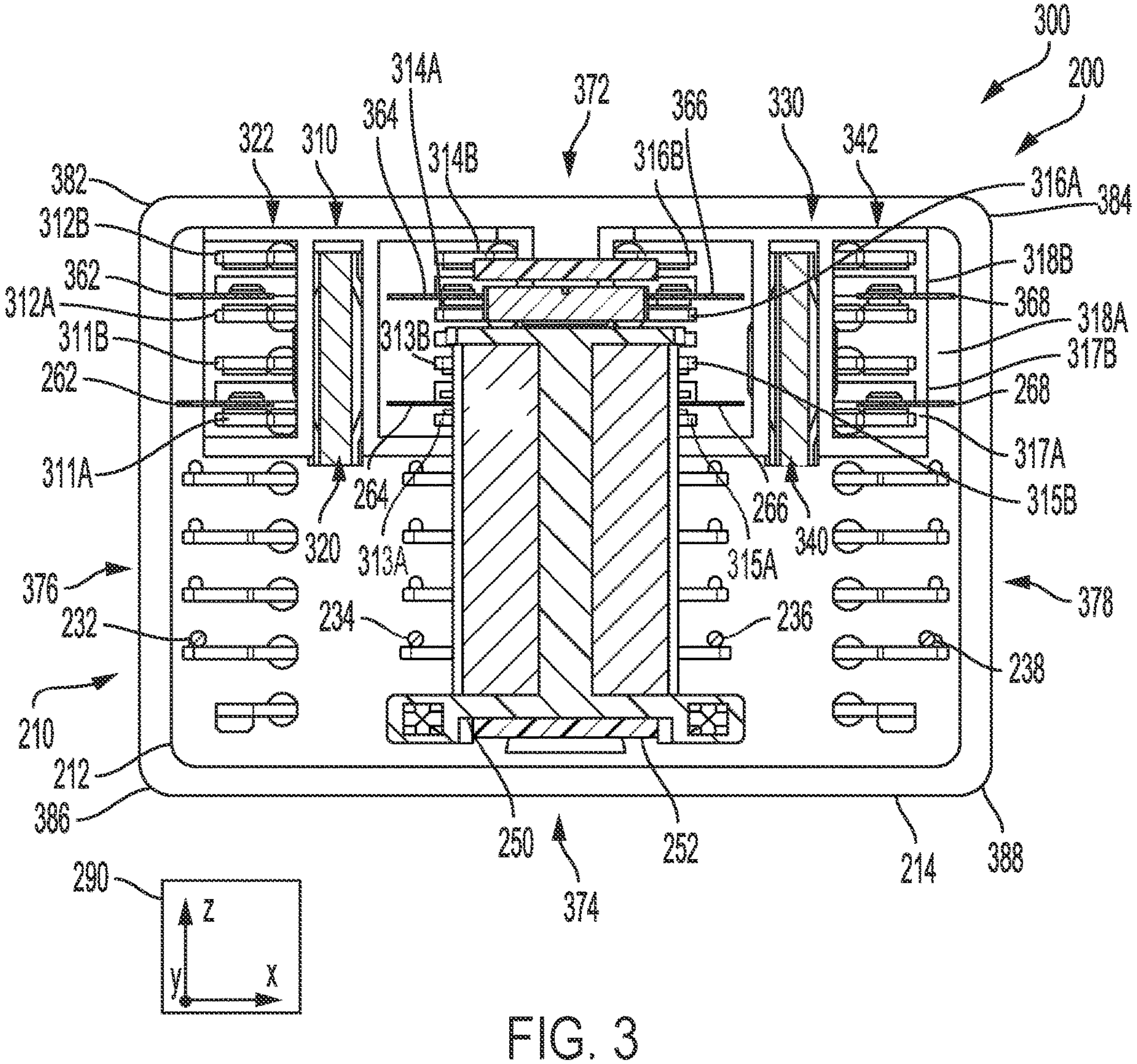
FIG. 3 shows a front view of the relay, according to an embodiment of the present disclosure.

Turning now to FIG. 3, it shows a front view 300 of the electromechanical relay assembly 200. As such, components previously introduced are similarly numbered in this and subsequent figures. The front view further illustrates a fifth moving contact 362, a sixth moving contact 364, a seventh moving contact 366, and an eighth moving contact 368. Each of the first through eighth moving contacts may be configured to oscillate between corresponding fixed contacts based on an energization/deenergization of the coil of the core. Specifically, the first moving contact may oscillate between a first pair of fixed contacts including fixed contacts 311A and 311B. The second moving contact may oscillate between a second pair of fixed contacts including fixed contacts 313A and 313B. The third moving contact may oscillate between a third pair of fixed contacts including fixed contacts 315A and 315B. The fourth moving contact may oscillate between a fourth pair of fixed contacts including fixed contacts 317A and 317B. The fifth moving contact may oscillate between a fifth pair of fixed contacts including fixed contacts 312A and 312B. The sixth moving contact may oscillate between a sixth pair of fixed contacts including fixed contacts 314A and 314B. The seventh moving contact may oscillate between a seventh pair of fixed contacts including fixed contacts 316A and 316B. The eighth moving contact may oscillate between an eighth pair of fixed contacts including fixed contacts 318A and 318B. Each of the moving contacts may physically touch only a first of the corresponding fixed contacts in a first position and only a second of the corresponding fixed contacts in a second position.

The first, second, fifth, and sixth moving contacts may be a first group of contacts arranged in a first permanent magnetic assembly 310. The first permanent magnetic assembly may further house the first, second, third, and fourth pairs of fixed contacts. A first magnetic device 320 may be arranged in the first permanent magnetic assembly between the first and second moving contacts and the fifth and sixth moving contacts. The first permanent magnetic assembly may include a first plurality of walls 322 configured to house the components of the first permanent magnetic assembly adjacent to a first side of the core.

The third, fourth, seventh, and eighth moving contacts may be arranged in a second permanent magnetic assembly 330. The second permanent magnetic assembly may further house the fifth, sixth, seventh, and eighth pairs of fixed contacts. A second magnetic device 340 may be arranged in the second permanent magnetic assembly between the third and fourth moving contact and the seventh and eighth moving contacts. The second permanent magnetic assembly may include a second plurality of walls 342 configured to house the components of the second permanent magnetic assembly adjacent to a second side of the core, the second side opposite the first side.

In one example, the first permanent magnetic assembly and the second permanent magnetic assembly may be arranged adjacent to corners of the mounting plate. More specifically, the first permanent magnetic assembly may be arranged adjacent to a first corner 382 and the second permanent magnetic assembly may be arranged adjacent to a second corner 384, opposite the first corner relative to a first longitudinal side 372 of the mounting plate. The mounting plate, including the first and second permanent magnetic assemblies may be symmetric about two axes, a first axis parallel to the z-axis and a second axis parallel to the y-axis.

The first wire may be coupled to a first terminal arranged between the first corner and a third corner 386, the third corner opposite the first corner relative to a first lateral side 376 of the mounting plate. In one example, the first terminal may be biased toward the third corner. The fourth wire may be coupled to a fourth terminal arranged between the second corner and a fourth corner 388, the fourth corner opposite the second corner relative to a second lateral side 378 and opposite the third corner relative to a second longitudinal side 374. The fourth terminal may be biased toward the fourth corner. The first longitudinal side may be opposite to the second longitudinal side and normal to the first lateral side and the second lateral side. The first lateral side may be opposite the second lateral side and normal to the first longitudinal side and the second longitudinal side.

The second wire may be coupled to a second terminal and the third wire may be coupled to a third terminal. The first through fourth terminals may be aligned along the x-axis, parallel to the first and second longitudinal sides and closer to the second longitudinal side than the first longitudinal side.

Figure 4:
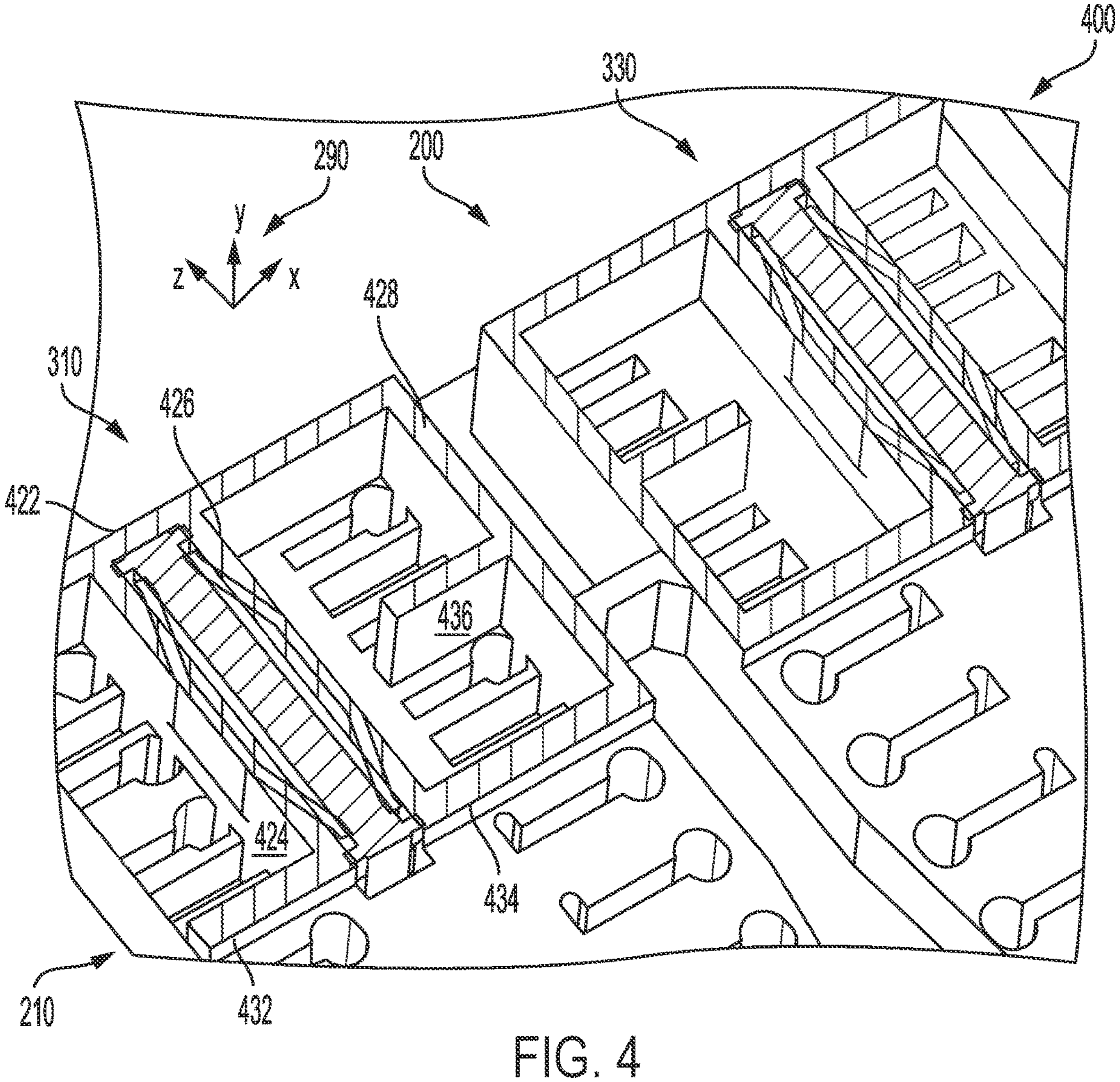
FIG. 4 shows a cross-sectional view of the relay, according to an embodiment of the present disclosure.
Figure 5:
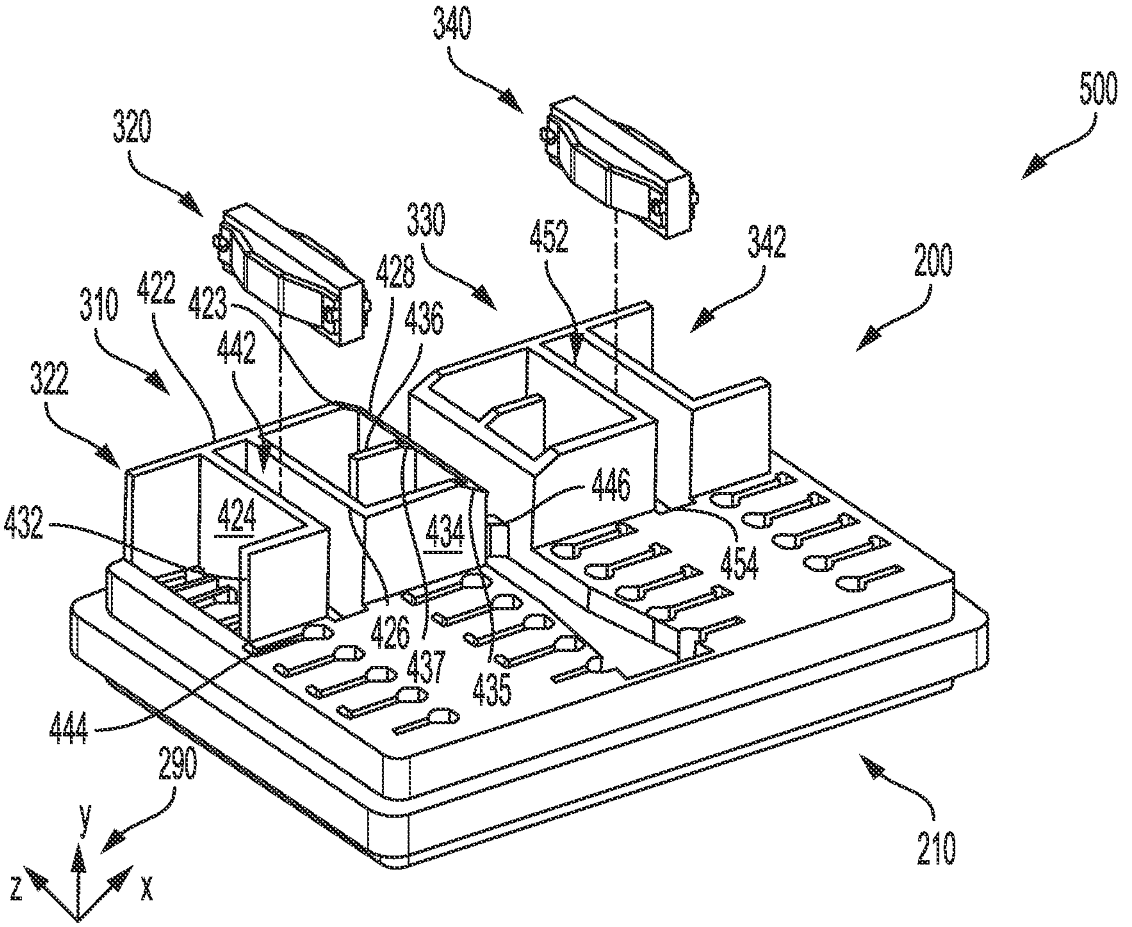
FIG. 5 shows an exploded view of the relay, according to an embodiment of the present disclosure.

Turning now to FIGS. 4 and 5, they show a cross-sectional view 400 taken along the x-z plane and an exploded view 500, respectively. The cross-sectional view illustrates the first magnetic device and the second magnetic device inserted in the first permanent magnetic assembly and the second permanent magnetic assembly, respectively. The exploded view illustrates the first and second magnetic devices being inserted into corresponding slots shaped in the first and second plurality of walls, respectively.

The first plurality of walls may include a first longitudinal wall 422 from which a first lateral wall 424, a second lateral wall 426, and a third lateral wall 428 extend. A length of the first, second, and third laterals walls, measured along the z-axis, may be identical. The second lateral wall may be positioned between the first and third lateral walls.

A second longitudinal wall 432, parallel to the first longitudinal wall, may extend from the first lateral wall in a direction toward the first lateral side of the mounting plate. In one example, the first and second longitudinal walls are physically coupled to opposite extreme ends of the first lateral wall.

A third longitudinal wall 434, parallel to the first and second longitudinal walls, may extend from the second and third lateral walls. In one example, the first and third longitudinal walls are physically coupled to opposite extreme ends of the second and third lateral walls.

A fourth longitudinal wall 436, parallel to the first through third longitudinal walls, may extend from the third lateral wall in a direction toward the second lateral wall. In one example, the fourth longitudinal wall is physically coupled to a section of the third lateral wall between the first and third longitudinal walls.

Each of the first, third, and fourth longitudinal walls may include corresponding sloped sections 423, 435, and 437, respectively, that extend down and to a top of the third lateral wall. As such, a height of the third lateral wall may be less than heights of each of the first through fourth longitudinal walls and the first and second lateral walls.

A first gap 442 may be arranged between the first and second lateral walls. The first gap may form a slot into which the first magnetic device is arranged. In one example, the first gap is shaped via the first longitudinal wall, the first lateral wall, the second lateral wall, and a lip 444 of the mounting plate. A height of the lip may be less than the height of the first longitudinal wall, the first lateral wall, and the second lateral wall. As such, the lip may help to retain the first magnetic device and facilitate quicker installation of the first magnetic device by increasing an opening size of the first gap, relative to the lip being equal in height to the first longitudinal wall, the first lateral wall, and the second lateral wall.

The first and fifth moving contacts along with the first and second pairs of fixed contacts may be arranged between the first lateral wall and the first lateral side. The second and sixth moving contacts along with the third and fourth pairs of fixed contacts may be arranged between the second lateral wall and the third lateral wall. The location of the first gap, and therefore the first magnetic device, may be positioned adjacent or in an arc zone. The first magnetic device may repel the arc generated when a switching action occurs, which may improve a longevity of components of the electromechanical relay.

The second permanent magnet assembly may be substantially identical to the first permanent magnet assembly. The second permanent magnet assembly may include the first through fourth longitudinal walls and first through third lateral walls. The third lateral walls of the first and second permanent magnet assemblies may be adjacent to one another and coupled to a bridge 446.

The second permanent magnet assembly may further include a second gap 452 arranged between the first and second lateral walls. The second gap may form a slot into which the second magnetic device is arranged. In one example, the second gap is shaped via the first longitudinal wall, the first lateral wall, the second lateral wall, and a lip 454 of the mounting plate. The second magnetic device may be inserted into the second gap, in a manner similar to the first magnetic device.

In one embodiment, a mounting plate of an electromechanical relay may include a plurality of magnetic assemblies. Each of the magnetic assemblies may include a plurality of moving contacts configured to actuate between corresponding fixed contacts. Lateral walls of the magnetic assembly may separate a first set of moving and fixed contacts from a second set of moving and fixed contacts. At least one magnetic device may be arranged in a gap between the lateral walls and retained within the gap via only leaf springs. The mounting plate is illustrated with two magnetic assemblies in the examples of FIGS. 4 and 5. However, other numbers of magnetic assemblies may be used, such as one, three, four, five, or more.

Figure 6A:
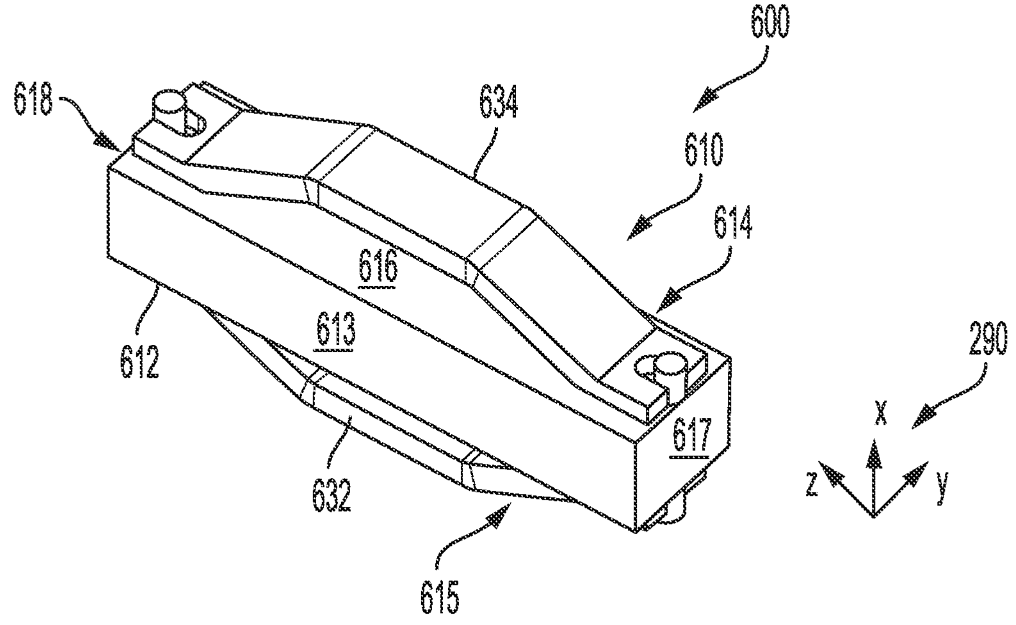
FIG. 6A shows a first view of a magnet of the relay, according to an embodiment of the present disclosure.
Figure 6B:
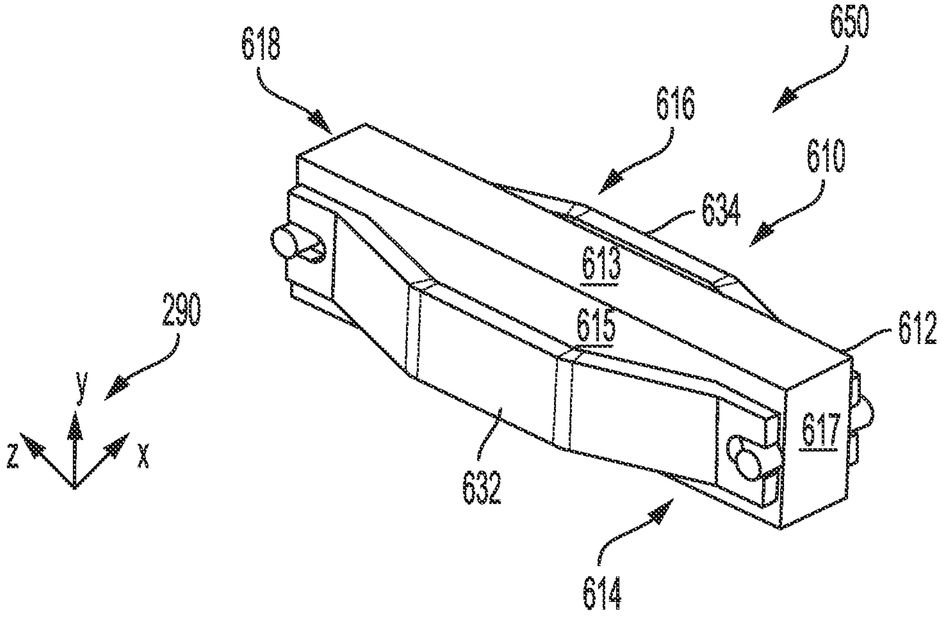
FIG. 6B shows a second view of the magnet of the relay, according to an embodiment of the present disclosure.

Turning to FIGS. 6A and 6B, they show view 600 and 650 of a magnetic device 610, respectively. The magnetic device may be identical to the first magnetic device and/or the second magnetic device of FIGS. 3-5. The magnetic device may include a body 612. The body may include a rectangular prism shape. Additionally or alternatively, the body may include a cube shape or other three-dimensional shape.

The body may include a top surface 613 opposite a bottom surface 614. A first side surface 615 may be opposite a second side surface 616, each of the side surfaces coupled to the top and bottom surfaces along opposite long edges. The body may further include a front surface 617 opposite a back surface 618. The front and back surface may be coupled to the top and bottom surfaces along opposite short edges and to the side surfaces along opposite long edges.

Figure 8:
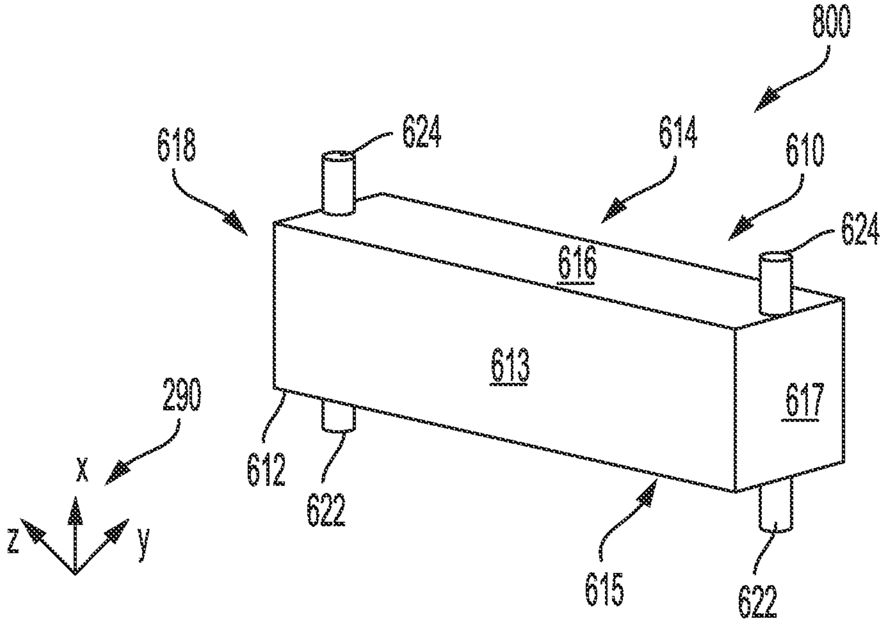
FIG. 8 shows an example of the magnet of the relay welded to ferro magnets, according to an embodiment of the present disclosure.

A first pair of magnets 622 may be welded to the first side surface and a second pair of magnets 624 may be welded to the second side surface, as shown in view 800 of FIG. 8. The pairs of magnets may include a cylindrical shape and extend in a direction parallel to the x-axis. In one example, the pairs of magnets are ferro-magnets welded to the body, wherein the body is a permanent magnet. In one example, the pair of magnets are protrusions extending in a direction normal to the side surfaces.

Figure 7:
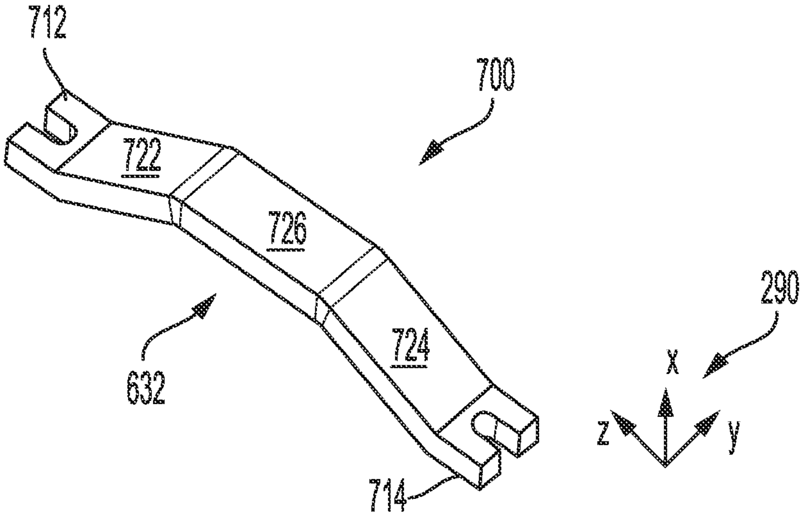
FIG. 7 shows an example of a leaf spring of the magnet of the relay, according to an embodiment of the present disclosure.

The magnetic device may further include a first leaf spring 632 and a second leaf spring 634. The first and second leaf springs may be identical to one another. A view 700 of the first leaf spring is shown in FIG. 7. The leaf spring may include a first tab end 712 and a second tab end 714. Each of the first and second tab ends may include a slot sized and shaped to receive one magnet of the first pair of magnets. The slot may extend in a direction parallel to a length of the leaf spring. In one example, the pair of magnets may orient the leaf spring into a desired position when each magnet of the pair of magnets is arranged within the slot of the first and second tab ends.

The leaf spring may further include a first angled surface 722 and a second angled surface 724. The first angled surface may be coupled to the first tab end and the second angled surface may be coupled to the second tab end. The angled surfaces may extend from the corresponding tab ends toward one another and coupled to opposite ends of a top surface 726. The angled surfaces may be angled opposite one another such that the leaf spring includes two axes of symmetry, a first axis parallel to the z-axis and a second axis parallel to the y-axis. The top surface may be flat and parallel to the first and second tab ends. As such, the angled surfaces may be angled relative to the top surface and first and second tab ends.

When the magnetic device is inserted into the first gap of the first permanent magnet assembly or the second gap of the second permanent magnet assembly, the leaf springs may be in face-sharing contact with the first and second lateral surfaces. The first and second pairs of magnets may face the first and second lateral surfaces, respectively. The back surface may face the first longitudinal wall and the front surface may face the lip. The first and second leaf springs may be compressed as the magnetic device is inserted into the first or second gap. As such, in a relaxed state, a width of the magnetic device including the leaf springs may be greater than a width of the first and/or second gap. The leaf springs may press against the lateral surfaces in opposite directions and provide a threshold tension, blocking removal of the magnetic device in response to forces less than a threshold force. In one example, the first leaf spring creates friction/tension with the first lateral wall and the second leaf spring creates friction/tension with the second lateral wall to retain the magnet within the gap between the first and second lateral walls. In one example, the threshold force is based on a force used to overcome the threshold tension and remove the magnetic device. The threshold tension may be based on forces experienced by the relay during operation such that only a user or a tool may remove the magnetic device.

By using separate magnetic devices, each arranged in corresponding assemblies including fixed and moving contacts, degradation of the relay components may be mitigated. The magnetic devices may deflect an arc generated during a switching of a position of the moving contacts. In this way, a longevity of the relay may be improved.

FIGS. 2-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 2-8 are shown to scale. However, other dimensions may be used if desired.

The disclosure provides support for a system including an electromechanical relay comprising at least one magnetic device arranged within a magnet assembly and retained within walls of the magnet assembly via a leaf spring. A first example of the system further includes where the at least one magnetic device is a first magnet device arranged in a first magnet assembly, further comprising a second magnet device arranged in a second magnet assembly. A second example of the system, optionally including the first example, further includes where the leaf spring is a first leaf spring, further comprising a second leaf spring. A third example of the system, optionally including one or more of the previous examples, further includes where the first leaf spring is in face-sharing contact with a first lateral wall of the magnet assembly, and wherein the second leaf spring is in face-sharing contact with a second lateral wall of the magnet assembly. A fourth example of the system, optionally including one or more of the previous examples, further includes where the first and second leaf springs apply forces in opposite directions against walls of the magnet assembly. A fifth example of the system, optionally including one or more of the previous examples, further includes where the at least one magnetic device is arranged between fixed and moving contacts of the electromechanical relay.

The disclosure provides further support for an electromechanical relay including a first group of fixed and moving contacts arranged within a first assembly, a second group of fixed and moving contacts arranged within a second assembly, and a first magnetic device arranged between a first lateral wall and a second lateral wall of the first assembly and a second magnetic device arranged between first and second lateral walls of the second assembly. the first magnetic device is identical to the second magnetic device, and wherein the first and second magnetic devices are symmetric about two axes. A first example of the electromechanical relay further includes where the first and second magnetic devices comprise a first leaf spring and a second leaf spring, each of the first and second leaf springs comprising ends coupled to magnetic protrusions of the first and second magnetic devices. A second example of the electromechanical relay, optionally including the first example, further includes where the first leaf spring presses against the first lateral wall and the second leaf spring presses against the second lateral wall. A third example of the electromechanical relay, optionally including one or more of the previous examples, further includes where ends of the first and second leaf springs comprise a slot configured to receive one of the magnetic protrusions. A fourth example of the electromechanical relay, optionally including one or more of the previous examples, further includes where the magnetic protrusions are welded to side surfaces of the first and second magnetic devices and extend toward the first and second lateral walls. A fifth example of the electromechanical relay, optionally including one or more of the previous examples, further includes where a back surface of the first magnetic device faces a first longitudinal wall coupled to the first and second lateral wall of the first assembly, and wherein a back surface of the second magnetic device faces a first longitudinal wall coupled to the first and second lateral wall of the second assembly. A sixth example of the electromechanical relay, optionally including one or more of the previous examples, further includes where a width of the first magnetic device is greater than a width of a gap between the first and second lateral walls when the first magnetic device is removed from the gap. A seventh example of the electromechanical relay, optionally including one or more of the previous examples, further includes where the first magnetic device and the second magnetic device are identical.

The disclosure provides additional support for a system for an electromechanical relay including a mounting plate comprising a plurality of magnetic assemblies, each of the magnetic assemblies comprising a plurality of moving contacts configured to actuate between corresponding fixed contacts, wherein lateral walls separate a first set of moving and fixed contacts from a second set of moving and fixed contacts, further comprising a magnetic device arranged in a gap between the lateral walls and retained within the gap via only leaf springs. A first example of the system further includes where leaf springs are positioned on a permanent magnet of the magnetic device via protrusions inserted into slots of the leaf springs. A second example of the system, optionally including the first example, further includes where the leaf springs and protrusions are arranged on opposite sides of the permanent magnet. A third example of the system, optionally including one or more of the previous examples, further includes where the mounting plate is symmetric about at least one axis. A fourth example of the system, optionally including one or more of the previous examples, further includes where the gap in which the magnetic device is arranged is shaped via the lateral walls, a longitudinal wall, and a lip, wherein the lip is shorter than the lateral walls and longitudinal wall along a direction in which the magnetic device is inserted into the gap.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An electromechanical relay, comprising: a first group of fixed and moving contacts arranged within a first assembly; a second group of fixed and moving contacts arranged within a second assembly; and a first magnetic device arranged between a first lateral wall and a second lateral wall of the first assembly and a second magnetic device arranged between first and second lateral walls of the second assembly, wherein the first and second magnetic devices comprise a first leaf spring and a second leaf spring, each of the first and second leaf springs comprising two ends coupled to magnetic protrusions of the first and second magnetic devices, and wherein each of the two ends of the first and second leaf springs comprise a slot configured to receive one of the magnetic protrusions.

2. The electromechanical relay of claim 1, wherein the first magnetic device is identical to the second magnetic device, and wherein the first and second magnetic devices are symmetric about two axes.

3. The electromechanical relay of claim 1, wherein the first leaf spring presses against the first lateral wall and the second leaf spring presses against the second lateral wall.

4. The electromechanical relay of claim 1, wherein the magnetic protrusions are welded to side surfaces of the first and second magnetic devices and extend toward the first and second lateral walls.

5. The electromechanical relay of claim 1, wherein a back surface of the first magnetic device faces a first longitudinal wall coupled to the first and second lateral wall of the first assembly, and wherein a back surface of the second magnetic device faces a first longitudinal wall coupled to the first and second lateral wall of the second assembly.

6. The electromechanical relay of claim 1, wherein a width of the first leaf spring of the first magnetic device is greater than a width of a gap between the first and second lateral walls in a relaxed state.

7. The electromechanical relay of claim 1, wherein the first magnetic device and the second magnetic device are identical.

8. A system for an electromechanical relay, comprising:

a mounting plate comprising a plurality of magnetic assemblies, each of the magnetic assemblies comprising a plurality of moving contacts configured to actuate between corresponding fixed contacts, wherein lateral walls separate a first set of moving and fixed contacts from a second set of moving and fixed contacts, further comprising a magnetic device arranged in a gap between the lateral walls and retained within the gap via only leaf springs, wherein the leaf springs are positioned on a permanent magnet of the magnetic device via protrusions inserted into slots of the leaf springs, wherein the leaf springs create a threshold force that blocks removal of the magnetic device from the gap between the lateral walls in response to forces less than the threshold force.

9. The system of claim 8, wherein the leaf springs and protrusions are arranged on opposite sides of the permanent magnet.

10. The system of claim 8, wherein the mounting plate is symmetric about at least one axis.

11. The system of claim 8, wherein the gap in which the magnetic device is arranged is shaped via the lateral walls, a longitudinal wall, and a lip, wherein the lip is shorter than the lateral walls and longitudinal wall along a direction in which the magnetic device is inserted into the gap.

* * * * *